Figure 1:
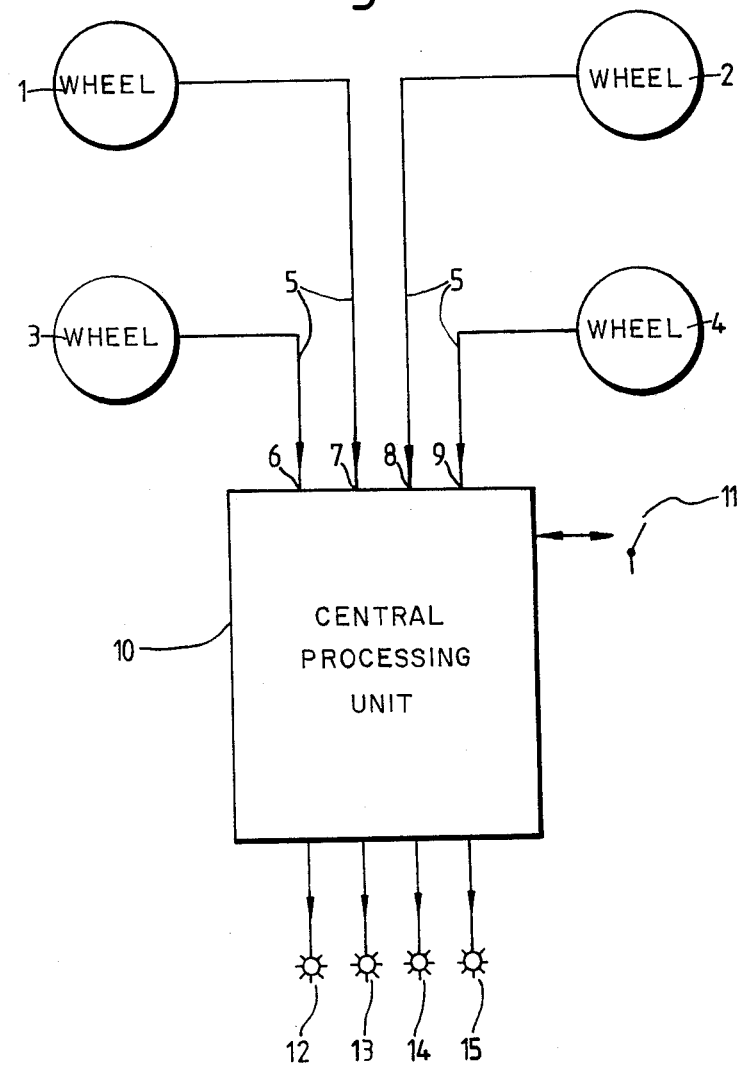

United States Patent [19]

Walker et al.

[11] Patent Number: 4,876,528
[45] Date of Patent: Oct. 24, 1989

[54] METHOD OF DETECTING A DEFLATED TIRE ON A VEHICLE

[75] Inventors: John C. Walker; Thomas Holmes, both of Sutton Coldfield, England

[73] Assignee: SP Tyres UK Limited, Birmingham, England

[21] Appl. No.: 193,741

[22] Filed: May 13, 1988

[30] Foreign Application Priority Data

May 13, 1987 [GB] United Kingdom ............... 8711310

[51] Int. Cl.$^4$ .......................................... B60C 23/00
[52] U.S. Cl. .................................. 340/442; 340/444; 340/671; 73/146.5
[58] Field of Search ............... 340/58, 669, 670, 671, 340/442, 444; 73/146.2, 146, 146.5; 116/34 R, 34 A, 34 B

[56] References Cited

U.S. PATENT DOCUMENTS 3,613,075 10/1971 Griffiths ................................ 340/58
3,691,524  9/1972 Frost et al. ........................... 340/58
4,506,328  3/1985 Bateman .............................. 340/58
4,545,623 10/1985 Sato et al. ............................ 340/58

Primary Examiner—Donnie L. Crosland
Attorney, Agent, or Firm—Birch, Stewart, Kolasch & Birch

[57] ABSTRACT

A method of detecting a deflated tire on a vehicle which includes sensing the angular velocity of each wheel and producing a signal proportional thereto, processing the four signals in a processor unit which subtracts the sum of the signals from one pair of diagonally opposite wheels from the sum of the signals from the other pair of diagonally opposite wheels, sensing when the magnitude of the result is between 0.05% and 0.60% of the mean of the two sums, comparing the signals for each of the four wheels in turn with the signals for each of the other wheels, sensing when one of said signals is different from the average of all four signals by more than 0.1% and in the event of both sensed signal factor being present, operating a warning device to indicate a tire is partially or completely deflated.

11 Claims, 1 Drawing Sheet

METHOD OF DETECTING A DEFLATED TIRE ON A VEHICLE

The present invention relates to a method of detecting a deflated tire on a vehicle and provides a system suitable for cars and trucks or the like.

Hitherto deflation warning devices have measured a property of the tire for example the internal pressure or temperature and then transmitted a signal to the vehicle body. The transmission may be by means of an electrical signal through slip rings at the hub or by radio transmission. Such transmission systems are expensive and notoriously unreliable, particularly in the hostile environment of a vehicle wheel, bearing in mind the infrequency of tire failures.

Inventors have, however, made a most unexpected discovery which confounds the usual theories. Theoretically a tire and especially a tire with a breaker has a constant, fixed circumference tread which travels in each wheel at the same speed with respect to the vehicle frame of reference as the vehicle speed on the road. The fixed length circumference means that each wheel rotates at the same angular velocity regardless of the amount of its deflation in the ground contact zone. However, the inventors have found that a radial tire does rotate with an increased angular velocity when it is deflated. For example it is found that in the case of a 13" car radial tire of the steel reinforced breaker type, a pressure loss of 1.2 bar increases the rotational speed by 0.27%, and it is on this discovery that the present invention is based.

It is a major object of the present invention to provide a method of detecting a deflated tire which does not suffer from the transmission problems of prior art systems and which provides a system at minimum costs and maximum reliability, fully commensurate with the modern vehicle and which in many cases can take full advantage of some of the electronic equipment already fitted to the vehicle.

According to the present invention a method of detecting a partially deflated pneumatic tire on a vehicle having four tires, each mounted on a wheels, comprises sensing the angular velocity of each wheel and producing a signal proportional thereto processing the four signals in a processing unit which subtracts the sum of the signals from one pair of diagonally opposite wheels from the sum of the signals from the other pair of diagonally opposite wheels, senses when the magnitude of the result is between 0.05% & 0.60%, of the mean of the two sums, compares the signal for each wheel in turn with the signals for each of the other wheels, senses when one of said signals is different from the average of all four wheels more than 0.1% and in the event of both senses factors being present operates a warning device to indicate the tire is partially or completely deflated.

More preferably the magnitude of the result is sensed in the range of 0.10% and 0.30%.

The processing unit preferably repeats the two sensing operations and operates the warning device when at least two successive results each give an indication of a deflated tire, but ignores results which are not followed by a similar result so that spurious signals are avoided.

Preferably the processing unit also monitors ;the lateral acceleration of the vehicle either by taking a signal from an acceleration sensing unit or by calculating the lateral acceleration by comparing the angular wheel velocity signals from each of the sides of the vehicle at both the front and rear pair of wheels. The processing unit determines when the vehicle lateral acceleration may cause a false indication and inhibits the warning signal. This depends on the lateral acceleration and the time for which it is in existence. In one preferred situation a figure of more than 0.03g average over a six second period is the critical case but this is dependent on vehicle load transfer conditions and the particular tires fitted.

The processing unit preferably also monitors vehicle acceleration and deceleration and inhibits the signals for accelerations which may cause a false signal. In a preferred case this inhibits the signal if a figure of 0.03 g averaged over a period of more than six seconds is reached. But again, this depends on load transfer and tire characteristics for the vehicle concerned.

In both of these cases of acceleration sensed inhibition, it is important to note the time factor. In use of a vehicle, accelerations as low as 0.03 g are only very rarely exceeded for the six second time specified and the system is then fully active for more than 95% of driving time.

To allow for increasing vehicle speed it is usually necessary to increase the sensitivity of the unit as the speed increases. This may be a continuous increase or a stepwise increase. The processing unit may also be inhibited when the vehicle brakes are applied.

The angular speed of the wheels of the vehicle may be measured either by a digital pulse generator associated with each wheel or by means of timing the rotation of each wheel.

An important advantage of this method of sensing the deflation in a vehicle tire is that it may utilise the electronic equipment and signal generating units already fitted to a vehicle for an electronically controlled anti-skid system. Such systems monitor vehicle speeds and by sensing deceleration of the wheels avoid wheel locking. Many of the systems already provide in modern vehicles, measurement of angular velocity by a digital pulsed signal generator which generates 48 or 96 pulses per revolution of each wheel.

Further aspects of the present invention will become apparent from the following description, by way of example only, of one embodiment in conjunction with the attached diagrammatic drawings wherein:

FIG. 1 is a schematic diagrammatic diagram showing a deflation warning device for a car having four wheels.

The apparatus shown in FIG.1. provides a deflation warning device for a car having four wheels, 1, 2, 3 & 4 the wheels 1 and 2 being the front wheels and wheels 3 and 4 the rear wheels of the car. Each wheel 1, 2, 3 and 4 has a toothed wheel device associated with it of the type designed and fitted to provide a digital signal following a lateral magnetic pickup suitable for a vehicle anti-skid system of the electronic type—often commonly known as the electronic ABS. Each pickup is however, additionally connected in this case to a deflation warning detection system which system uses the same digital signal as the ABS system.

The four signals are carried through cables 5 to four separate inputs 6, 7, 8 and 9 of a central processing unit 10. Four separate indicator lights 12, 13, 14 & 15 are provided one for each wheel 1,2,3 & 4. These lights are most conveniently mounted on the vehicle dash-board perhaps in a line diagram of the vehicle.

The control processing unit is basically a computer which monitors the various signals and compares them to determine whether or not it should give an outward signal to indicate that a tire of the vehicle is deflated.

Assuming that the respective frequencies of the signals from the front wheels 1 and 2 are F1 and F2 and the frequencies from the rear wheels 3 & 4, are F3 & F4 respectively and that these signals are all digital pulse signals, it can be seen that the unit may compute these digital signals and by following the principles of calculation to be described below calculates whether or not to send a deflation warning signal to one of the warning lights 12, 13, 14 or 15. It should be noted that under normal conditions of full tire inflation and straight running the four frequency signals will be substantially the same, and that under cornering of the vehicle F2=F4 and F1=F3. Similarly under acceleration in a straight line F1=F2 and F3=F4.

By way of example a Ford Granada vehicle having pulse generating units at each of its four wheels was utilised. The wheel generators have 96 teeth and so produce 96 pulses per revolution of each wheel. The vehicle was run at a speed of 100 km per hour on a fairly straight road, first with the tires inflated at 2.0 bar in each of the four tires, and secondly with three tires inflated to 2.4 bar and the rear right tire inflated to 1.8 bar.

The counts for time intervals of 6 seconds were totalled for each of the wheels and then an error signal dF was calculated using the formula, $$dF = \frac{2 \times (F14 - F23) \times 100}{(F14 + F23)}$$

where $F14 = F1 + F1$ and $F23 = F2 + F3$

The results in the table have been chosen to show the different counts arising from different situations on the vehicle as follows:

ceeded the preset value of 0.03 g and inhibits the calculation of dF so that in effect the unit is switched off.

c. The next result is for the condition where the vehicle is accelerating at more than 0.03 g when again the unit inhibits the calculation of dF.

d. The next result shows the condition where the lateral acceleration of the vehicle is greater than 0.03 g as calculated from the wheel speeds and the unit is again switched off.

The next block of results shows similar tests with the right hand rear wheel of the vehicle deflated to 1.8 bar and the other three tires set at 2.4 bar. The first three results e) are equivalent to the first three in the upper part of the table and show dF figures of 0.115%, 0.095% and 0.135% which exceed the necessary value for a pressure loss signal to be given and show a running mean dF of 0.115%. It should be noted that the lateral and forward accelerations were calculated to be zero because the vehicle was running straight and so that system proceeds to calculate dF and also looks at the difference between each wheel and the signals for each of the other wheels where it can be seen that the difference is more than 0.1% and thus gives a pressure loss signal output.

The next two results f show, for comparative purposes, results for the same vehicle set up with the right rear wheel deflated at 50 km per hour to show that even with a lower count speed the unit is still able to calculate the acceleration laterally and in the forward direction and in the first case where it finds that the vehicle is decelerating at more than 0.03 g it inhibits the operation of the unit but in the second result where it finds no lateral or forward acceleration exceeding the value of 0.03 g it calculates the dF value and obtains a result of 0.13% which means that it gives a pressure loss signal, having also checked the difference.

| SPEED INFLATION PRESSURE | | F1 | F2 | F3 | F4 | Fav | G lat | G for | d F% | d F% RUNNING MEAN 3 |
|---|---|---|---|---|---|---|---|---|---|---|
| 120 Km/h | | | | | | | | | | |
| 2.0 bar | ⎫ | 10002 | 10002 | 10002 | 10002 | 10002 | — | — | 0.000% | |
| 2.0 bar | ⎬ a | 10001 | 10003 | 10003 | 10001 | 10002 | −1 | −1 | −0.020% | 0.000% |
| 2.0 bar | ⎭ | 10003 | 10001 | 10001 | 10003 | 10002 | — | — | +0.020% | |
| 2.0 bar | b | 9502 | 9500 | 9500 | 9502 | 9501 | — | <−0.03 | — | |
| 2.0 bar | c | 10504 | 10502 | 10502 | 10504 | 10503 | — | >+0.03 | — | |
| 2.0 bar | d | 9754 | 11252 | 9752 | 11254 | 10503 | >0.03 | — | — | |
| 1.8 bar rear right tyre, 2.4 bar others | | | | | | | | | | |
| 1.8 bar | ⎫ | 10002 | 10002 | 10002 | 10025 | 10008 | — | — | 0.115% | |
| 1.8 bar | ⎬ e | 1000 | 10003 | 10003 | 10024 | 10008 | — | — | 0.095% | 0.115% |
| 1.8 bar | ⎭ | 10003 | 10001 | 10001 | 10026 | 10008 | — | — | 0.135% | |
| 50 Km/h | | | | | | | | | | |
| 2.0 bar | ⎫ | 5003 | 5001 | 5001 | 5020 | 5006 | — | <−0.03 | — | |
| 2.0 bar | ⎬ f | 5001 | 5003 | 5003 | 5010 | 5005 | — | — | 0.130 | |
| 2.0 bar | ⎭ — cornering | | | | | | | | | |
| 120 Km/h | | | | | | | | | | |
| 2.0 bar | ⎫ | 10252 | 9752 | 10252 | 9752 | 10008 | <0.03 | — | 0.000% | |
| 2.0 bar | ⎬ g | 10251 | 9753 | 10253 | 9751 | 10008 | <0.03 | — | −0.020% | 0.000% |
| 2.0 bar | ⎭ | 10253 | 9751 | 10251 | 9753 | 10008 | <0.03 | — | +0.020% | |
| 1.8 bar - cornering rear right tyre, 2.4 bar others | | | | | | | | | | |
| 1.8 bar | ⎫ | 10252 | 9752 | 10252 | 9775 | 10008 | <0.03 | — | 0.115% | |
| 1.8 bar | ⎬ h | 10251 | 9753 | 10253 | 9774 | 10008 | <0.03 | — | 0.095% | 0.115% |
| 1.8 bar | ⎭ | 10253 | 9751 | 10251 | 9776 | 10008 | <0.03 | — | 0.135% | | a. The first three results show successive six second period counts for the vehicle with all four wheels inflated to 2.0 bar while running straight. As can be seen dF is in a very small range over the three periods and a running mean of 0 was obtained.

b. The fourth result shows the condition when the vehicle is decelerated at more than 0.03 g, when the unit calculates from the successive counts that g has ex- The next section of results g shows a vehicle at 120 km per hour with 2.0 bar in all of the tires but under a cornering condition and the three successive periods of six seconds shown all have a calculated lateral acceleration of less than 0.03 g and therefore dF is calculated but because all four wheels are fully inflated the dF values are very small.

Finally the last part h of the chart of the table shows a cornering test again at 120 km per hour with the right-hand rear vehicle tire deflated to 1.8 bar and the other three tires set at 2.4 bar. In the three successive periods of six seconds shown, lateral acceleration is calculated to be less than 0.03 g, and therefore the calculation of dF proceeds and it can be seen that figures of 0.115%, 0.095% and 0.135% are obtained which cause the pressure loss signal to be generated. In this situation, the system checked that the count figure for F4 is more than 0.1% different from the average of the wheels, as can be seen from the count figures.

The actual calculation of the lateral and longitudinal accelerations is carried out by the calculation of the wheel angular velocity signals for each side of the vehicle, comparing them and then comparing the signals from the front and rear pairs of wheels and the forward speed calculated from the means of the angular velocities, so that the unit is able to calculate accelerations without additional signal inputs.

As an alternative to calculating the acceleration and deceleration of the vehicle in its forward direction it is possible to connect a brake signal to the unit to inhibit it when the brake is touched. This may be done by connection to the stop light switch, but it is preferred to sense vehicle acceleration by means of calculation from the wheel speeds themselves. For the lateral accelerations an accelerometer may be utilised in a similar way.

In the above examples the means of assessing the angular velocity of each wheel has been to count for a period of six seconds using a toothed wheel with 96 teeth and then to simply total the count in the periods. This is directly proportional to the angular velocity of the wheel in that period. The period of six seconds is by no means critical but it has been found to be a reasonable period to give a fairly quick response and yet to give sufficient counts for straightforward computer systems to be able to calculate and sense the small wheel speed change which result from a pressure loss of only part of a bar. Alternative count times may be used and indeed another useful way of avoiding spurious pressure loss signals is to compare successive periods of for example six seconds and only to give a signal if two successive periods have a warning signal calculated. This improves the ability to ignore wheel hop and other short term conditions such as wheel spin.

To fully allow for tire and vehicle characteristics it is preferred to trigger, manually or otherwise a calibration indicating signal. This is done above 20 km per hour in substantially straight running.

As an alternative to counting i.e. using a digital signal to measure the angular velocity in each wheel, a timing system can be used where the time for a given number of counts, for example 100, can be taken and then used to compute the various wheel speeds from the time. This leads to the obvious conclusion that an alternative to timing 100 pulses for example, the timing from one pulse to another could be used which allows the possibility of using the system with a wheel speed detector which gives a single pulse per revolution of the wheel. Thus the time period from pulse to pulse is the time for a single rotation of the wheel and this gives the advantage that a very simple wheel speed detector can be utilised.

In both systems the methods of calculation are the same once a value has been obtained for the angular velocity of each wheel.

In vehicles which travel at high speed there is also a speed effect on the tire in that the loss in rolling radius on pressure loss becomes less at high speeds due to tire characteristics and in some cases lifting of the vehicle from aerodynamic forces. This can be allowed for by the system increasing the sensitivity of detection by changing the critical dF values for initiating a pressure loss signal at high speeds of the vehicle. This can be done by sensing the vehicle speed from the angular velocity measured and using that speed to increase the sensitivity of the system.

In each case of lateral acceleration, longitudinal acceleration, vehicle speed, and vehicle loading, which can also be allowed for, the characteristics of the vehicle and the tires themselves are important and vary from tire to tire and vehicle to vehicle. Thus the constants which are used in the resultant algorithm of all the above sensing conditions vary according to each vehicle. Nevertheless, it has been shown that these can be selected for each vehicle to give pressure loss sensing for a wheel of a vehicle of 0.6 bar or better. The actual means of computation in a vehicle is not a part of this invention and simply involves normal computer techniques with programmes chosen according to the language and operating system of the computer to be used. In that case the computer can be a part of the ABS computer for the vehicle.

Having now described my invention what I claim is:

1. A method of detecting a partially deflated pneumatic tire on a vehicle having four tires, each mounted on a wheel, which comprises
    sensing the angular velocity of each wheel and producing a signal proportional thereto,
    processing the four signals in a processor unit which subtracts the sum of the signals from one pair of diagonally opposite wheels from the sum of the signals from the other pair of diagonally opposite wheels,
    sensing when the magnitude of the result is between 0.05% and 0.60% of the mean of the sums,
    comparing the signals for each of the four wheels in turn with the signals for each of the other wheels,
    sensing when one of said signals is different from the average of all four signals by more than 0.1%, and in the event of both sensed signal factor bring present, operates a warning device to indicate a tire is partially or complete deflated.

2. The method according to claim 2 wherein the magnitude of the result is sensed in the range of 0.10% and 0.30%.

3. The method according to claim 1 wherein the processing unit repeats the two sensing operations and operates the warning device when at least two successive results each give an indication of a tire subject to pressure loss.

4. The method according to claim 1 wherein the processing unit also monitors a lateral acceleration signal for the vehicle and inhibits the warning signal for vehicle lateral accelerations greater than 0.03 g averaged over a period of 6 seconds or more.

5. The method according to claim 4 wherein the processing unit itself calculates the lateral acceleration by comparison of the wheel angular velocity signals from side to side of the vehicle at both the front and rear pairs of wheels and the vehicle forward speed, calculated from the mean of the angular velocities.

6. The method according to claim 1 wherein the processing unit calculates the acceleration and deceleration of the vehicle in its direction of travel by monitoring the rate of change of the sum of the angular velocity of all four wheels with relation to time and inhibits the pressure loss warning signal if the vehicle acceleration or deceleration exceeds 0.03 g averaged over a period of six seconds or more.

7. The method according to claim 1 wherein the processing unit monitors the vehicle speed and for high vehicle speeds further decreases the result and the wheel speed difference signals for a pressure loss warning signal to be given.

8. The method according to claim 1 wherein the processing unit operation is inhibited when the vehicle has its brakes applied.

9. The method according to claim 1 wherein the processing unit measures the angular velocities of all four wheels at a calibration speed above 20 km per hour, and on receiving a calibration request signal, corrects for initial differences in rolling radius.

10. The method according to any one of claims 1 to 8 wherein the angular velocity of the wheels is measured by a digital pulse generator associated with each wheel.

11. The method according to claim 1 wherein the angular velocity of the wheels is measured by a signal generated from the time of rotation of each wheel.

* * * * *